US011336612B2

(12) United States Patent
Park et al.

(10) Patent No.: US 11,336,612 B2
(45) Date of Patent: May 17, 2022

(54) METHOD AND APPARATUS FOR SHARING USER EVENT BETWEEN CHATBOTS

(71) Applicant: N-TUPLE.CO.LTD., Seoul (KR)

(72) Inventors: Hyun-Min Park, Seoul (KR); Ho-Gyu Lee, Seoul (KR)

(73) Assignee: N-TUPLE.CO.LTD., Seoul (KR)

( * ) Notice: Subject to any disclaimer, the term of this patent is extended or adjusted under 35 U.S.C. 154(b) by 455 days.

(21) Appl. No.: 16/326,625

(22) PCT Filed: Aug. 16, 2017

(86) PCT No.: PCT/KR2017/008916
§ 371 (c)(1),
(2) Date: Feb. 19, 2019

(87) PCT Pub. No.: WO2018/034494
PCT Pub. Date: Feb. 22, 2018

(65) Prior Publication Data
US 2021/0234826 A1    Jul. 29, 2021

(30) Foreign Application Priority Data

Aug. 16, 2016  (KR) .................. 10-2016-0103645

(51) Int. Cl.
*H04L 51/56* (2022.01)
*H04L 51/02* (2022.01)

(52) U.S. Cl.
CPC .............. *H04L 51/36* (2013.01); *H04L 51/02* (2013.01)

(58) Field of Classification Search
CPC ......... H04L 51/02; H04L 51/04; H04L 51/36; H04L 51/20; H04L 12/1813; H04L 51/026; H04L 41/026; H04L 41/5093
See application file for complete search history.

(56) References Cited

U.S. PATENT DOCUMENTS

| 10,681,212 | B2* | 6/2020 | Sanghavi | H04L 51/046 |
| 11,218,429 | B2* | 1/2022 | Yun | G10L 17/22 |
| 2006/0020948 | A1* | 1/2006 | Carr | G06F 9/542 |
| | | | | 719/318 |
| 2010/0138377 | A1* | 6/2010 | Wright | G06F 40/284 |
| | | | | 706/52 |
| 2014/0046973 | A1* | 2/2014 | Rinearson | G06F 16/80 |
| | | | | 707/769 |

(Continued)

FOREIGN PATENT DOCUMENTS

| JP | 2014-115946 A | 6/2014 |
| KR | 10-2005-0007058 A | 1/2005 |

(Continued)

*Primary Examiner* — Sargon N Nano
(74) *Attorney, Agent, or Firm* — Novick, Kim & Lee, PLLC; Sang Ho Lee; Hyun Woo Shin

(57) ABSTRACT

Provided is a method by which a cross chatbot gateway allows an event to be shared between chatbotsu, and the method includes the steps of: receiving an event message from a first chatbot communicating with a first chatting server using a first chatting protocol, wherein the event message includes destination information and event information of a first user, who is a chatting counterpart of the first chatbot; and transmitting the event information to a second chatbot communicating with a second chatting server using a second chatting protocol, on the basis of the destination information.

24 Claims, 7 Drawing Sheets

(56) References Cited

U.S. PATENT DOCUMENTS

| | | | |
|---|---|---|---|
| 2014/0122619 A1* | 5/2014 | Duan | G06F 40/20 |
| | | | 709/206 |
| 2015/0172505 A1* | 6/2015 | Park | H04N 1/00244 |
| | | | 358/1.15 |
| 2015/0185996 A1* | 7/2015 | Brown | G06F 3/04842 |
| | | | 715/706 |
| 2016/0092522 A1* | 3/2016 | Harden | G06F 16/9535 |
| | | | 707/602 |
| 2016/0094492 A1* | 3/2016 | Li | H04L 51/02 |
| | | | 709/206 |
| 2016/0135020 A1* | 5/2016 | Moshir | H04L 63/0428 |
| | | | 455/466 |
| 2017/0048170 A1* | 2/2017 | Smullen | H04L 67/306 |
| 2017/0230312 A1* | 8/2017 | Barrett | H04L 51/02 |
| 2017/0246545 A1* | 8/2017 | Wilhite | H04L 51/046 |
| 2018/0025726 A1* | 1/2018 | Gatti de Bayser | G10L 15/22 |
| | | | 704/257 |
| 2018/0096686 A1* | 4/2018 | Borsutsky | H04L 51/02 |
| 2018/0131645 A1* | 5/2018 | Magliozzi | G06F 40/30 |
| 2018/0181558 A1* | 6/2018 | Emery | H04M 3/4936 |
| 2018/0375815 A1* | 12/2018 | Dinardo, Sr. | H04L 51/24 |
| 2019/0036849 A1* | 1/2019 | Uppala | G06Q 10/107 |
| 2019/0068527 A1* | 2/2019 | Chen | G06Q 10/00 |
| 2019/0109803 A1* | 4/2019 | Akkiraju | G09B 5/02 |
| 2019/0140986 A1* | 5/2019 | Anderson | H04L 67/104 |
| 2019/0158433 A1* | 5/2019 | Yun | G06F 3/167 |
| 2020/0044997 A1* | 2/2020 | Jang | H04W 4/14 |
| 2021/0027286 A1* | 1/2021 | Strashnoy | G06Q 20/223 |
| 2021/0035576 A1* | 2/2021 | Kang | H04L 51/02 |

FOREIGN PATENT DOCUMENTS

| | | |
|---|---|---|
| KR | 10-2007-0045394 A | 5/2007 |
| KR | 10-2009-0072599 A | 7/2009 |
| KR | 10-2013-0026564 A | 3/2013 |

* cited by examiner

METHOD AND APPARATUS FOR SHARING USER EVENT BETWEEN CHATBOTS

TECHNICAL FIELD

The present invention relates to a method and apparatus for sharing a user's event between chatbots.

BACKGROUND ART

As social networking service (SNS) is recently developed, messenger services, such as the KaKao Talk, Line and Facebook messengers, are widely used. A robot talking with a user through a messenger, that is, a chatbot technology, is developed. A technology in which such a chatbot talks with a user and also shares an event regarding the user with another chatbot is required.

DISCLOSURE

Technical Solution

A method of sharing an event between chatbots performed by a cross chatbot gateway according to an embodiment of the present invention includes receiving an event message from a first chatbot communicating with a first chatting server using a first chatting protocol, wherein the event message includes destination information and event information of a first user, that is, a chatting counterpart of the first chatbot, and transmitting the event information to a second chatbot communicating with a second chatting server using a second chatting protocol based on the destination information.

In one embodiment, the first chatbot and the second chatbot are different types of chatbots.

In one embodiment, the destination information includes a chatbot user ID. The chatbot user ID includes the ID of the second chatbot and the ID of a second user, that is, a chatting counterpart of the second chatbot. Transmitting the event information includes transmitting the event information to the chatbot user ID.

In one embodiment, the chatbot user ID includes the messenger type ID of the second chatting server. The first chatting server and the second chatting server are chatting servers for different types of messengers.

In one embodiment, the method further includes storing some or all of the event information in a database, and providing corresponding information when a provision request for some or all of the event information stored in the database is received from the second chatbot.

In one embodiment, transmitting the event information includes transmitting information providing notification that some or all of the event information has been stored in a database to the second chatbot.

In one embodiment, the method further includes generating event information and destination information, and transmitting the generated event information to the second chatbot based on the generated destination information.

In one embodiment, the method further includes generating an event sharing group, registering a first chatbot user ID, including the ID of the first chatbot and the ID of the first user, with the event sharing group, receiving an event sharing group join request including a second chatbot user ID, wherein the second chatbot user ID includes the ID of the second chatbot and the ID of a second user, that is, a chatting counterpart of the second chatbot, and registering the second chatbot user ID with the event sharing group based on the event sharing group join request.

In one embodiment, the group join notification of the second chatbot user ID is transmitted to chatbot user IDs registered with the event sharing group.

In one embodiment, the method further includes transmitting IDs of event sharing groups with which the first chatbot user ID has been registered to the first chatbot when a group join information provision request for the first chatbot user ID is received from the first chatbot.

In one embodiment, the method further includes transmitting chatbot user IDs, registered with the event sharing group, to the first chatbot when a member information provision request for the event sharing group is received from the first chatbot.

In one embodiment, transmitting the event information to all chatbot user IDs registered with each event sharing group with which the first chatbot user ID has been registered when the destination information does not indicate a specific event sharing target.

In one embodiment, the destination information includes at least one of an event sharing group ID, a messenger type ID of a chatting server, a chatbot ID, and a user ID. Transmitting the event information includes transmitting the event information to chatbot user IDs, corresponding to the destination information, among chatbot user IDs grouped with the first chatbot user ID.

In one embodiment, the destination information includes the ID of the event sharing group. Transmitting the event information includes transmitting the event information to all chatbot user IDs registered with the event sharing group.

In one embodiment, the destination information includes the ID of the event sharing group and the ID of the second chatbot. Transmitting the event information includes transmitting the event information to all chatbot user IDs, corresponding to the ID of the second chatbot, among chatbot user IDs registered with the event sharing group.

In one embodiment, the method further includes receiving an event sharing group generation request including the first chatbot user ID. Generating the event sharing group includes generating the event sharing group based on the event sharing group generation request. Registering the first chatbot user ID includes registering the first chatbot user ID based on the event sharing group generation request.

In one embodiment, the event sharing group join request is received from the second chatbot and includes the first chatbot user ID. Generating the event sharing group includes generating the event sharing group based on the event sharing group join request. Registering the first chatbot user ID includes registering the first chatbot user ID based on the event sharing group join request.

In one embodiment, the method further includes transmitting the ID of the event sharing group to the first chatbot user ID. The event sharing group join request is received from the second chatbot and includes the ID of the event sharing group transmitted to the first chatbot user ID.

In one embodiment, the event sharing group join request includes authentication information. Registering the second chatbot user ID includes registering the second chatbot user ID only when the authentication information is valid.

In one embodiment, the event sharing group join request is received from the first chatbot and includes the ID of the event sharing group.

In one embodiment, the first chatbot user ID includes a messenger type ID of the first chatting server. The second chatbot user ID includes a messenger type ID of the second chatting server. The first chatting server and the second chatting server are chatting servers for different types of messengers.

In one embodiment, the method further includes receiving an event sharing coupling request, including a first chatbot user ID and a second chatbot user ID, from the first chatbot, wherein the first chatbot user ID includes the ID of the first chatbot and the ID of the first user and the second chatbot user ID includes the ID of the second chatbot and the ID of a second user, that is a chatting counterpart of the second chatbot, and registering the first chatbot user ID and the second chatbot user ID as a couple based on the event sharing coupling request.

In one embodiment, the method further includes transmitting coupling notification with the first chatbot user ID to the second chatbot user ID.

In one embodiment, the method further includes transmitting chatbot user IDs, coupled with the second chatbot user ID, to the second chatbot when a coupling information provision request for the second chatbot user ID is received from the second chatbot.

In one embodiment, transmitting the event information includes transmitting the event information to all chatbot user IDs coupled with the first chatbot user ID when the destination information does not indicate a specific event sharing target.

In one embodiment, the destination information includes at least one of a messenger type ID of a chatting server, a chatbot ID, and a user ID. Transmitting the event information includes transmitting the event information to chatbot user IDs, corresponding to the destination information, among chatbot user IDs coupled with the first chatbot user ID.

In one embodiment, the destination information includes the ID of the second chatbot. Transmitting the event information includes transmitting the event information to all chatbot user IDs, corresponding to the second chatbot ID, among chatbot user IDs coupled with the first chatbot user ID.

A method of sharing an event between chatbots performed by a first chatbot communicating with a first chatting server using a first chatting protocol according to an embodiment of the present invention includes receiving a chatting message of a first user from the first chatting server, generating event information of the first user and destination information at which the event information is to be received based on the chatting message, and transmitting an event message, including the event information of the first user and the destination information, to a cross chatbot gateway.

In one embodiment, the method further includes receiving event information of a second user, that is, a chatting counterpart of a second chatbot communicating with a second chatting server using a second chatting protocol, from the cross chatbot gateway.

In one embodiment, the destination information is generated so that a second chatbot communicating with a second chatting server using a second chatting protocol receives the event information. The first chatbot and the second chatbot are different types of chatbots.

In one embodiment, the destination information includes a chatbot user ID. The chatbot user ID includes the ID of a second chatbot communicating with a second chatting server using a second chatting protocol and the ID of a second user, that is, a chatting counterpart of the second chatbot.

In one embodiment, the chatbot user ID includes the messenger type ID of the second chatting server. The first chatting server and the second chatting server are chatting servers for different types of messengers.

In one embodiment, the method further includes generating event information and destination information without being based on a specific chatting message of a user received from a chatting server, and transmitting an event message, including the event information and destination information generated without being based on the specific chatting message of the user, to the cross chatbot gateway.

In one embodiment, the method further includes generating event information and destination information based on the event information of the second user, and transmitting an event message, including the event information and destination information generated based on the event information of the second user, to the cross chatbot gateway.

In one embodiment, the method further includes receiving the chatting message of the first user to request provision of a chatbot user ID of the first user from the first chatting server, and transmitting the chatbot user ID, including the ID of the first chatbot and the ID of the first user, to the first chatting server.

In one embodiment, the chatbot user ID includes a messenger type ID of the first chatting server.

In one embodiment, the method further includes transmitting an event sharing group generation request, including a first chatbot user ID including the ID of the first chatbot and the ID of the first user, to the cross chatbot gateway.

In one embodiment, the method further includes receiving a group generation request chatting message of the first user, including a second chatbot user ID, from the first chatting server. The second chatbot user ID includes the ID of a second chatbot communicating with a second chatting server using a second chatting protocol and the ID of a second user, that is, a chatting counterpart of the second chatbot. The event sharing group generation request further includes the second chatbot user ID.

In one embodiment, the method further includes receiving an event sharing group join request chatting message of the first user, including the ID of an event sharing group, from the first chatting server, and transmitting an event sharing group join request, including the ID of the event sharing group and a first chatbot user ID, to the cross chatbot gateway. The first chatbot user ID further includes the ID of the first chatbot and the ID of the first user.

In one embodiment, the method further includes receiving an event sharing group join request chatting message of the first user, including a second chatbot user ID and requesting group join of the second chatbot user ID, from the first chatting server, wherein the second chatbot user ID includes the ID of a second chatbot communicating with a second chatting server using a second chatting protocol and the ID of a second user, that is, a chatting counterpart of the second chatbot, and transmitting an event sharing group join request, including an event sharing group ID and the second chatbot user ID, to the cross chatbot gateway.

In one embodiment, the method further includes transmitting a group join information provision request for a first chatbot user ID to the cross chatbot gateway, wherein the first chatbot user ID includes the ID of the first chatbot and the ID of the first user, and receiving IDs of event sharing groups with which the first chatbot user ID has been registered from the cross chatbot gateway.

In one embodiment, the method further includes transmitting a member information provision request for an event sharing group to the cross chatbot gateway, and receiving chatbot user IDs registered with the event sharing group from the cross chatbot gateway.

In one embodiment, the destination information indicates all chatbot user IDs grouped with a first chatbot user ID.

In one embodiment, the destination information includes at least one of an event sharing group ID, a messenger type ID of a chatting server, a chatbot ID, and a user ID.

In one embodiment, the destination information includes an event sharing group ID and does not include a chatbot ID and a user ID.

In one embodiment, the destination information includes an event sharing group ID and the ID of a second chatbot, and does not include a user ID.

In one embodiment, the method further includes generating an event sharing group, registering a first chatbot user ID, including the ID of the first chatbot and the ID of the first user, with the event sharing group, receiving an event sharing group join request including a second chatbot user ID, The second chatbot user ID includes the ID of the second chatbot and the ID of a second user, that is, a chatting counterpart of the second chatbot, and registering the second chatbot user ID with the event sharing group based on the event sharing group join request.

In one embodiment, the event sharing group join request is received from the cross chatbot gateway. Generating the event sharing group includes generating the event sharing group based on the event sharing group join request.

In one embodiment, the event sharing group join request is received from the cross chatbot gateway and includes the ID of the event sharing group.

In one embodiment, the event sharing group join request is the chatting message of the first user received from the first chatting server. Generating the event sharing group includes generating the event sharing group based on the event sharing group join request.

In one embodiment, the event sharing group join request is the chatting message of the first user received from the first chatting server, and includes the ID of the event sharing group.

In one embodiment, the method further includes receiving an event sharing coupling request chatting message of the first user, including a second chatbot user ID, from the first chatting server, and transmitting an event sharing coupling request, including a first chatbot user ID and the second chatbot user ID, to the cross chatbot gateway. The first chatbot user ID includes the ID of the first chatbot and the ID of the first user. The second chatbot user ID includes the ID of a second chatbot communicating with a second chatting server using a second chatting protocol and the ID of a second user, that is, a chatting counterpart of the second chatbot.

In one embodiment, the method further includes transmitting a coupling information provision request for the first chatbot user ID to the cross chatbot gateway, and receiving chatbot user IDs coupled with the first chatbot user ID from the cross chatbot gateway.

In one embodiment, the destination information indicates all chatbot user IDs coupled with the first chatbot user ID.

In one embodiment, the destination information includes at least one of a messenger type ID of a chatting server, a chatbot ID, and a user ID.

In one embodiment, the destination information includes the ID of the second chatbot and does not include a user ID.

In one embodiment, the method further includes receiving an event sharing coupling request, including a second chatbot user ID, from the cross chatbot gateway, and registering a first chatbot user ID and the second chatbot user ID as a couple. The first chatbot user ID includes the ID of the first chatbot and the ID of the first user. The second chatbot user ID includes the ID of a second chatbot communicating with a second chatting server using a second chatting protocol and the ID of the second user, that is, a chatting counterpart of the second chatbot.

In one embodiment, the method further includes receiving an event sharing coupling request chatting message of the first user, including a second chatbot user ID, from the first chatting server, and registering a first chatbot user ID and the second chatbot user ID as a couple. The first chatbot user ID includes the ID of the first chatbot and the ID of the first user. The second chatbot user ID includes the ID of a second chatbot communicating with a second chatting server using a second chatting protocol and the ID of a second user, that is, a chatting counterpart of the second chatbot.

In one embodiment, generating the event information of the first user and the destination information at which the event information is to be received based on the chatting message includes generating the event information or the destination information based on a type of a group or couple with which the first user has been registered.

In one embodiment, generating the event information of the first user and the destination information at which the event information is to be received based on the chatting message includes generating the event information or the destination information based on a type of chatbot registered with a group or couple with which the first user has been registered.

In one embodiment, generating the event information of the first user and the destination information at which the event information is to be received based on the chatting message includes generating the event information or the destination information based on personal information of a second user registered with a group or couple with which the first user has been registered.

In one embodiment, the method further includes transmitting a personal information provision request, including a chatbot user ID, to the cross chatbot gateway, and receiving personal information, corresponding to the chatbot user ID, from the cross chatbot gateway. Generating the event information of the first user and the destination information at which the event information is to be received based on the chatting message includes generating the event information or the destination information based on the personal information.

A method of sharing an event between chatbots performed by a cross chatbot gateway according to an embodiment of the present invention includes receiving the ID of a first chatbot and the ID of a first user of the first chatbot, receiving the ID of a second chatbot and the ID of a second user of the second chatbot, registering the first user of the first chatbot and the second user of the second chatbot as an event sharing group based on the ID of the first chatbot, the ID of the first user, the ID of the second chatbot, and the ID of the second user, and delivering event information of the first user received from the first chatbot to the second user or event information of the second user received from the second chatbot to the first user based on the event sharing group.

A method of sharing an event between chatbots, which is performed by a first chatbot communicating with a first chatting server using a first chatting protocol according to an embodiment of the present invention, includes receiving a chatting message of a first user from the first chatting server, generating event information of the first user based on the chatting message, transmitting the event information of the first user to a cross chatbot gateway, and receiving event information of a second user, that is, a chatting counterpart of a second chatbot communicating with a second chatting server using a second chatting protocol, from the cross chatbot gateway.

In one embodiment, the first chatbot and the second chatbot are different chatbots.

A method of sharing an event between chatbots, which is performed by a first chatbot communicating with a first chatting server using a first chatting protocol according to an embodiment of the present invention, includes receiving a chatting message of a first user from the first chatting server, generating event information of the first user and destination information at which the event information is to be received based on the chatting message, and transmitting the event information to a second chatbot communicating with a second chatting server using a second chatting protocol based on the destination information.

In one embodiment, the method further includes receiving event information of a second user, that is, a chatting counterpart of the second chatbot, from the second chatbot.

In one embodiment, the first chatbot and the second chatbot are different types of chatbots.

In one embodiment, the destination information includes a chatbot user ID. The chatbot user ID includes the ID of the second chatbot and the ID of a second user, that is, a chatting counterpart of the second chatbot. Transmitting the event information includes transmitting the event information to the chatbot user ID.

In one embodiment, the chatbot user ID includes the messenger type ID of the second chatting server. The first chatting server and the second chatting server are chatting servers for different types of messengers.

In one embodiment, the method includes generating event information and destination information without being based on a specific chatting message of a user received from a chatting server and transmitting an event message, including the event information and destination information generated without being based on a specific chatting message of the user, to a second chatbot.

In one embodiment, the method further includes receiving event information of a second user from a cross chatbot gateway, generating event information and destination information based on the event information of the second user, and transmitting an event message, including the event information and destination information generated based on the event information of the second user, to the second chatbot.

In one embodiment, the method further includes receiving the chatting message of the first user, requesting the provision of the chatbot user ID of the first user, from the first chatting server and transmitting a chatbot user ID, including the ID of the first chatbot and the ID of the first user, to the first chatting server.

In one embodiment, the ID of the first chatbot includes the URL of the first chatbot.

In one embodiment, the chatbot user ID includes the messenger type ID of the first chatting server.

In one embodiment, the method further includes generating an event sharing group, registering a first chatbot user ID, including the ID of the first chatbot and the ID of the first user, with the event sharing group, receiving an event sharing group join request including a second chatbot user ID, The second chatbot user ID includes the ID of the second chatbot and the ID of a second user, that is, a chatting counterpart of the second chatbot, and registering the second chatbot user ID with the event sharing group based on the event sharing group join request.

In one embodiment, the event sharing group join request is received from the second chatbot. Generating the event sharing group includes generating the event sharing group based on the event sharing group join request.

In one embodiment, the event sharing group join request is received from the second chatbot and includes the ID of the event sharing group.

In one embodiment, the event sharing group join request is the chatting message of the first user received from the first chatting server. Generating the event sharing group includes generating the event sharing group based on the event sharing group join request.

In one embodiment, the event sharing group join request is the chatting message of the first user received from the first chatting server and includes the ID of the event sharing group.

In one embodiment, the method further includes receiving an event sharing coupling message, including a second chatbot user ID, from the second chatbot, and registering a first chatbot user ID and the second chatbot user ID as a couple. The first chatbot user ID includes the ID of the first chatbot and the ID of the first user. The second chatbot user ID includes the ID of the second chatbot and the ID of a second user, that is, a chatting counterpart of the second chatbot.

In one embodiment, the method further includes receiving an event sharing coupling request chatting message of the first user, including a second chatbot user ID, from the first chatting server, and registering a first chatbot user ID and the second chatbot user ID as a couple. The first chatbot user ID includes the ID of the first chatbot and the ID of the first user. The second chatbot user ID includes the ID of the second chatbot and the ID of a second user, that is, a chatting counterpart of the second chatbot.

In one embodiment, the ID of the first chatbot includes the URL of the first chatbot. The ID of the second chatbot includes the URL of the second chatbot.

In one embodiment, the ID of the second chatbot includes the URL of the second chatbot.

A cross chatbot gateway according to an embodiment of the present invention includes a communication unit transmitting and receiving data and a controller. The controller receives an event message from a first chatbot communicating with a first chatting server using a first chatting protocol through the communication unit. The event message includes destination information and event information of a first user, that is, a chatting counterpart of the first chatbot. The controller transmits the event information to a second chatbot communicating with a second chatting server using a second chatting protocol based on the destination information through the communication unit.

A chatbot server according to an embodiment of the present invention includes a communication unit transmitting and receiving data and a first chatbot. The first chatbot receives a chatting message of a first user from a first chatting server using a first chatting protocol through the communication unit, generates event information of the first user and destination information at which the event information is to be received based on the chatting message, and transmits an event message, including the event information of the first user and the destination information, to a cross chatbot gateway through the communication unit.

A chatbot server according to an embodiment of the present invention includes a communication unit transmitting and receiving data and a first chatbot. The first chatbot receives a chatting message of a first user from a first chatting server using a first chatting protocol through the communication unit, generates event information of the first user based on the chatting message, transmits the event information of the first user to a cross chatbot gateway through the communication unit, and receives event information of a second user, that is, a chatting counterpart of a second chatbot communicating with a second chatting server using a second chatting protocol, from the cross chatbot gateway through the communication unit.

A cross chatbot gateway according to an embodiment of the present invention includes a communication unit transmitting and receiving data and a controller. The controller receives the ID of a first chatbot and the ID of a first user of the first chatbot through the communication unit, receives the ID of a second chatbot and the ID of a second user of the second chatbot through the communication unit, registers the first user of the first chatbot and the second user of the second chatbot as an event sharing group based on the ID of the first chatbot, the ID of the first user, the ID of the second chatbot, and the ID of the second user, and delivers a sharing event of the first user received from the first chatbot to the second user or delivers a sharing event of the second user received from the second chatbot to the first user based on the event sharing group through the communication unit.

A chatbot server according to an embodiment of the present invention includes a communication unit transmitting and receiving data and a first chatbot. The first chatbot receives a chatting message of a first user from a first chatting server using a first chatting protocol through the communication unit, generates event information of the first user and destination information at which the event information is to be received based on the chatting message, and transmits the event information to a second chatbot communicating with a second chatting server using a second chatting protocol based on the destination information through the communication unit.

The present invention includes a program stored in a medium in order to execute a method according to an embodiment of the present invention in a compute.

The present invention includes a computer-readable recording medium on which a program for executing a method according to an embodiment of the present invention has been recorded.

BEST MODE

Figure 1:
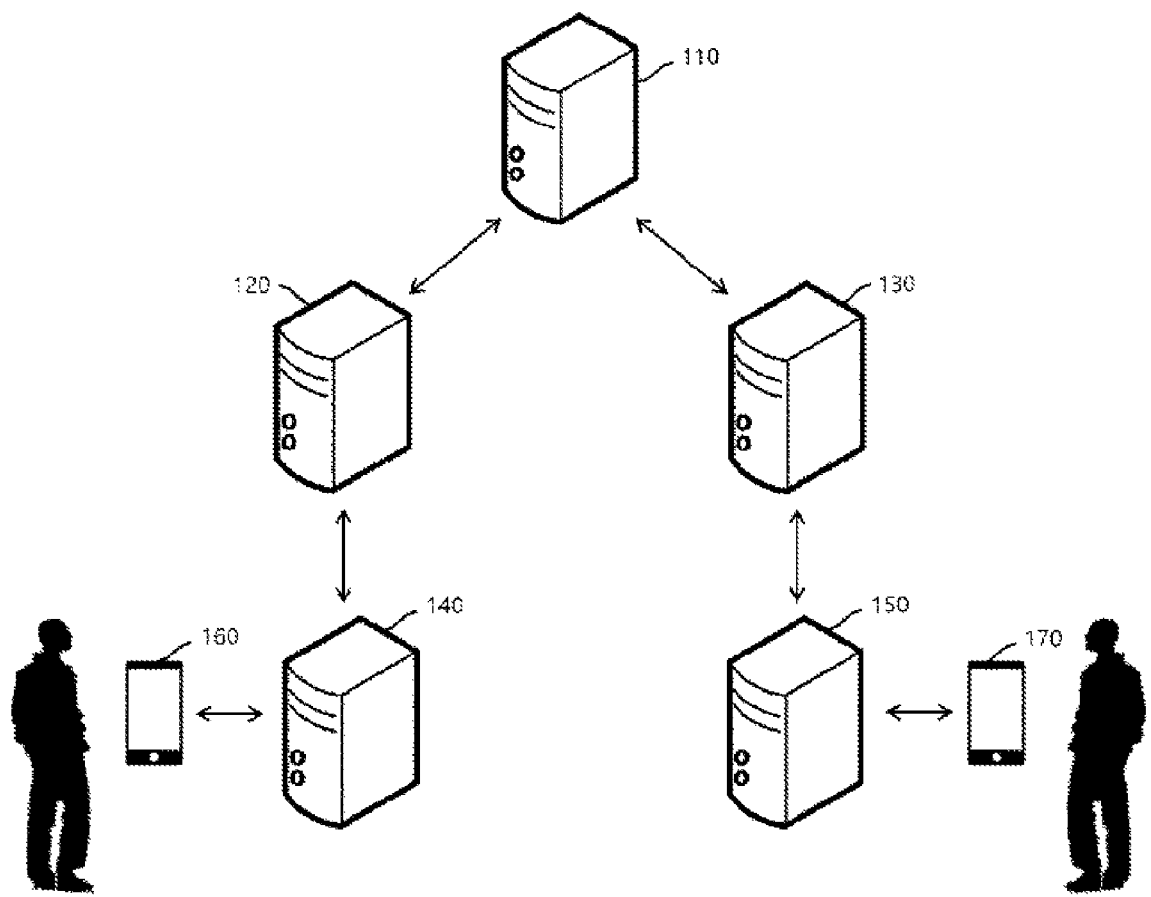
FIG. 1 is a diagram schematically showing the configuration of a system for sharing an event between chatbots according to an embodiment of the present invention.

Hereinafter, in order to clarify the technical spirit of the present invention, embodiments of the present invention are described in detail with reference to the accompanying drawings. In describing the embodiments of the present invention, a detailed description of a related known function or element will be omitted if it is deemed to make the gist of the present invention unnecessarily vague. Elements having substantially the same functional configuration in the drawings are assigned the same reference numeral although they are shown in different drawings. For convenience of description, both an apparatus and method are described, if necessary.

FIG. 1 is a diagram schematically showing the configuration of a system for sharing an event between chatbots according to an embodiment of the present invention. Referring to FIG. 1, the system for sharing an event between chatbots according to an embodiment of the present invention includes a cross chatbot gateway (CCG) 110, a first chatbot server 120, a second chatbot server 130, a first chatting server 140, a second chatting server 150, and user terminals 160 and 170 in which chatting clients communicating with the chatting servers have been installed. A load balancer server, such as L4, L7, a server playing the role of a load balancer, may be present ahead of each server.

The chatting server 140, 150 is a server providing messenger service, such as Kakao Talk or Line. The user terminal 160, 170 is a messenger client, such as a smartphone or a desktop computer, and is a terminal capable of exchanging chatting messages with the chatting server 140, 150 using a chatting protocol through communication. The first chatting server 140 and the second chatting server 150 may be the same or different. In particular, the first chatting server 140 and the second chatting server 150 may be chatting servers for different types of messengers. For example, the first chatting server 140 may be a Line messenger server, and the second chatting server 150 may be a Facebook messenger server.

The chatbot server 120, 130 is an apparatus that talks with a user using a chatbot, and includes a communication unit transmitting and receiving data and a chatbot exchanging chatting messages with the chatting server 140, 150 using chatting protocols through the communication unit. That is, the first chatbot of the first chatbot server 120 may talk with a first user, that is, a user of the first chatting server 140, by exchanging chatting messages with the first chatting server 140 using a first chatting protocol. The second chatbot of the second chatbot server 130 may talk with a second user, that is, a user of the second chatting server 150, by exchanging chatting messages with the second chatting server 150 using a second chatting protocol. The first user and the second user may be the same person or different persons.

The first chatting protocol and the second chatting protocol may be the same or different. The chatting protocol includes a bot API. That is, when the chatbot server 120, 130 communicates with the chatting server 140, 150, it may communicate with the chatting server 140, 150 using a known chatting protocol as if it is a known user terminal, and may communicate with the chatting server 140, 150 using a bot API provided by the service provider of the chatting server 140, 150. The first chatbot and the second chatbot may be different types of chatbots. For example, the first chatbot may be a CGV movie booking chatbot, and the second chatbot may be a Google calendar chatbot. Hereinafter, a chatbot server and a chatbot are not specifically distinguished for convenience of description other than a required case.

The cross chatbot gateway 110 is an apparatus that delivers a user event between different chatbots, and may include a communication unit transmitting and receiving data and a controller processing data transmitted and received through the communication unit. Chatbots that will use the cross chatbot gateway may have been previously registered with the cross chatbot gateway, and users using a chatbot may have been previously registered with the cross chatbot gateway. Hereinafter, operations of the system for sharing an event between chatbots are described specifically.

First, the first chatbot and the second chatbot are registered with the cross chatbot gateway. Each chatbot may have a unique ID, which is called a "chatbot ID." The chatbot ID may be issued on the cross chatbot gateway side when the chatbot is registered with the cross chatbot gateway. The cross chatbot gateway may store the ID of each registered chatbot, and may store the URL of each chatbot.

A first user, that is, a user of the first chatting server, exchanges chatting messages with the first chatbot via the first chatting server through a terminal. Each user may have a unique ID, which is called a "user ID." The user ID may be an ID assigned on the chatting server side, that is, an SNS messenger platform. The user ID may be unique with respect to the entire corresponding messenger, but a user ID that is unique with respect to a specific chatbot is assigned when a user adds the specific chatbot as a friend or follows the specific chatbot, in general.

While the first chatbot exchanges chatting messages with the first user through communication with the first chatting server through the communication unit, when an event to be shared with a different chatbot occurs in talk contents with the first user, the first chatbot may generate event information of the first user and destination information in order to share the event with the different chatbot. That is, in the present invention, a chatbot may determine whether an event will be shared, which contents will be shared, with whom an event will be share, etc. In this case, the different chatbot with which an event will be shared may be selected from chatbots previously registered to share an event. A method of registering a chatbot with which an event will be shared is described later.

The first chatbot may generate an event message of the first user, including the event information and the destination information, and may transmit to the cross chatbot gateway through the communication unit. The event message may be a structured message, such as xml or json, and may include source information (e.g., chatbot information, a chatbot ID or a user ID that has transmitted the event) in addition to the event information and the destination information.

In this case, the event information of the first user generated and transmitted by the first chatbot is new information generated based on a chatting message transmitted by the first user. For example, when a CGV movie booking chatbot receives a message, indicating that a movie viewing schedule should be added to a calendar, from a first user after it books a movie in response to a request from the first user, the CGV movie booking chatbot may generate information on the movie viewing schedule, and may transmit the information to the cross chatbot gateway using a Google calendar chatbot as a destination.

The cross chatbot gateway receives the event message from the first chatbot, and transmits the event information of the first user to the second chatbot based on the destination information of the event message. The cross chatbot gateway may deliver the entire event message, received from the first chatbot, to the second chatbot without any change. Meanwhile, the cross chatbot gateway transmitting the event information received from the first chatbot to the second chatbot includes a case where the event information is partially modified and transmitted in addition to the case where the event information is transmitted without any change. For example, if the received event information includes a photo to be shared with a different person, the cross chatbot gateway may deliver event information including the photo without any change, or may store the photo in its own database and then deliver only event information including only information indicating that the photo has been shared. In this case, when the different person who has received the sharing information requests the corresponding photo from the cross chatbot gateway, the cross chatbot gateway may read the photo stored in the database and transmit it. That is, the cross chatbot gateway may have stored some of or the entire event information received from the first chatbot in the database, may notify the second chatbot that some of or the entire event information has been stored, and may provide the stored information when a request is received from the second chatbot.

The second chatbot that has received the event information of the first user from the cross chatbot gateway may perform proper processing based on the received event information, and may transmit a suitable chatting message to the second user based on the received event information. For example, the Google calendar chatbot that has received the movie viewing schedule information may add a corresponding schedule to the calendar of the second user, and may notify the second user that the schedule has been added.

The destination information of the event message may include ID information indicative of a specific user of a specific chatbot, which is called a "chatbot user ID." The chatbot user ID may include the ID of a chatbot and the ID of a user, that is, a chatting counterpart of the corresponding chatbot. That is, a chatbot attempting to share an event may transmit an event message using a specific chatbot as a destination, and may also transmit an event message using a specific user of a specific chatbot as a destination. Hereinafter, transmitting an event message or event information to another device using a specific user of a specific chatbot as a destination is represented as transmitting the event message or event information to the corresponding chatbot user ID.

A chatbot user ID may include a messenger type ID of a corresponding chatting server in addition to a chatbot ID and a user ID. For example, the KaKao Talk messenger may use an ID, such as "1", the Line messenger may use an ID, such as "2", and the Facebook messenger may use an ID, such as "3." If a messenger type ID is included in a chatbot user ID as described above, an event can be shared between the chatbots of different messengers. For example, an operation for a user who has booked a movie through the CGV movie booking chatbot of the Line messenger to transmit a movie viewing schedule to the Google calendar chatbot of the Facebook messenger is possible. The messenger type ID may be determined on the cross chatbot gateway side.

A chatbot user ID including a messenger type ID, a chatbot ID, and a user ID as described above is called a "global virtual ID." If a global virtual ID is used, all users who uses a chatbot can be uniquely specified. Accordingly, an event can be shared among all chatbots and all users. When a new user adds a chatbot as a friend or follows the chatbot, the chatbot may register the corresponding user with the cross chatbot gateway. The cross chatbot gateway may issue a global virtual ID to the user and manage it. In order to issue the global virtual ID, a method using a value issued by a DB or time may be used.

The cross chatbot gateway delivers event information, received from a chatbot, to a different chatbot. In some embodiments, the cross chatbot gateway may generate event information and destination information by itself and transmit the event information to a chatbot. Likewise, a chatbot generates event information based on a chatting message received from a user. In some embodiments, the chatbot may generate event information and destination information by itself without being based on a specific chatting message of a user, and may transmit an event message to the cross chatbot gateway. In particular, a chatbot may generate event information and destination information based on event information received from another chatbot. As described above, in accordance with the configuration in which a chatbot or the cross chatbot gateway generates event information by itself, for example, operations, such as that a movie booking chatbot asks a call for a taxi by transmitting movie theater location information to a taxi chatbot used by a user 30 minutes before the end of a movie viewing time, that the movie booking chatbot transmits a movie viewing schedule to a coupon chatbot so that a coupon (e.g., popcorn discount coupon) useful in a corresponding time can be issued, and that the coupon chatbot transmits the movie viewing schedule to a famous restaurant chatbot again so that the famous restaurant chatbot introduces a nearby famous restaurant after the movie viewing, are possible.

A chatbot may generate a virtual user within its server using a remote proxy pattern. When the chatbot transmits an event message to the virtual user, the event message may be automatically delivered to the cross chatbot gateway.

A method of registering a target with which an event will be shared is described below.

1. Method of Managing Event Sharing Group by Cross Chatbot Gateway

The cross chatbot gateway may manage a group of chatbot user IDs between which an event will be shared. Such a group is called an "event sharing group." Each event sharing group may have a unique ID. The cross chatbot gateway may store the members of each group, that is, chatbot user IDs registered with the corresponding group, in a database by associating the chatbot user IDs with the ID of the corresponding group. In this case, a corresponding chatbot and a corresponding user are considered to be registered with the event sharing group. When a chatbot requests the cross chatbot gateway to notify the chatbot of a group that a specific chatbot user ID has joined, the cross chatbot gateway may provide the IDs of event sharing groups including the corresponding chatbot user ID. Furthermore, when a chatbot requests the cross chatbot gateway to notify the chatbot of the members of a specific event sharing group, the cross chatbot gateway may provide the chatbot user IDs of the corresponding members. Accordingly, the chatbot can be aware of a group or chatbot user that will share an event with a specific chatbot user ID, and may determine a target with which the event will be shared, that is, destination information of an event message.

A chatbot may designate a sharing target of event information by including at least one of an event sharing group ID, a messenger type ID, a chatbot ID, and a user ID in destination information of an event message. For example, if only an event sharing group ID is included in destination information, event information may be delivered to all the members of a corresponding group. If an event sharing group ID and a chatbot ID are included, but a user ID is not included in destination information, event information may be delivered to all the members of a corresponding chatbot of a corresponding group. If only a chatbot ID is included in destination information, event information may be delivered to all the members of a corresponding chatbot, that is, members corresponding to the chatbot ID among all the members of all groups that the first user of the first chatbot has joined, regardless of a group. Event information may also be delivered to a specific global virtual ID. Furthermore, destination information may be generated in various combinations, such as that event information is delivered to all the members of a specific group and a specific user of a specific chatbot. If destination information does not indicate a specific target, for example, no ID is included in the destination information, event information may be delivered to all the members of all groups that the first user of the first chatbot has joined.

Figure 2:
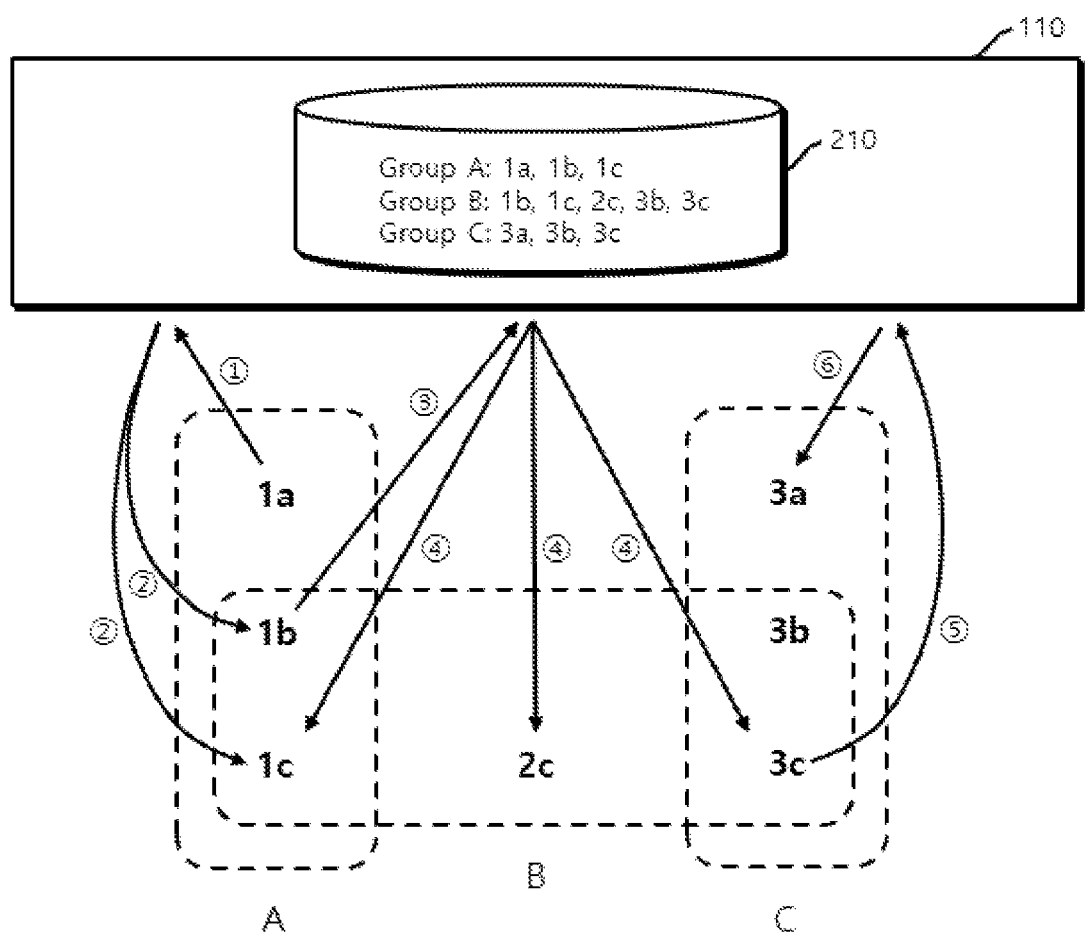
FIG. 2 is an exemplary diagram showing an operation of sharing an event between chatbots according to an embodiment of the present invention.

FIG. 2 is an exemplary diagram showing an operation of sharing an event between chatbots according to an embodiment of the present invention. In the drawing, "1a" shows the state in which a person "1" has added a chatbot "a" as a friend. A chatbot user ID for 1a may have a different form, but "1a" is used as a chatbot user ID without any change, for convenience of description. Referring to FIG. 2, chatbot user IDs 1a, 1b, and 1c are included in a group A, chatbot user IDs 1b, 1c, 2c, 3b, and 3c are included in a group B, and chatbot user IDs 3a, 3b, and 3c are included in a group C. As described above, one chatbot user ID may belong to several groups at the same time. The cross chatbot gateway 110 stores such group information in a database 210.

The chatbot of 1a determines whether to share an event, and determines to share the event of the user 1 with all the members of the group A. The chatbot of 1a transmits an event message to the cross chatbot gateway using the group A as a destination (①). The cross chatbot gateway transmits event information to 1b and 1c, that is, other members of the group A (②). The chatbot of 1b receives the event, performs required processing on the event, and determines to transmit the event to users using the chatbot c among the members of the group B. The chatbot of 1b transmits the event message to the cross chatbot gateway using the group B and the chatbot c as destinations (③). The cross chatbot gateway transmits the event information to 1c, 2c, and 3c corresponding to the chatbot c among the members of the group B (④). The chatbot of 3c receives the event, processes the event, generates a new event regarding the results of the processing, and determines to transmit the new event to 3a of the group C. The chatbot of 3c transmits the generated event to the cross chatbot gateway using the global virtual ID of 3a as a destination (⑤). The cross chatbot gateway transmits the event information to 3a (⑥). As described above, in accordance with the present invention, different chatbots can share event information in various manners.

Meanwhile, a method of generating an event sharing group and registering a chatbot user ID with an event sharing group may have various embodiments as follows.

(1) Method of Generating an Event Sharing Group

The first chatbot transmits an event sharing group generation request, including a first chatbot user ID including the ID of the first chatbot and the ID of the first user, to the cross chatbot gateway in response to a request from the first user or based on its own determination. In this case, the first chatbot user ID may be a global virtual ID including a messenger type ID. The chatbot gateway that has received the event sharing group generation request generates an event sharing group and registers the first chatbot user ID with the group. In some embodiments, the cross chatbot gateway may generate an event sharing group by itself without a request from a chatbot.

(2) Method of Receiving ID of Another User and Generating Event Sharing Group

The first chatbot provides the chatbot user ID of the first user to the first user in response to a request from the first user or based on its own determination. The chatbot user ID may be provided in various forms, such as a text string, a number, a link, an image, a moving image, a sound, and QR code. For example if the first chatbot user ID is provided in an encrypted text string form, the first user receives the text string and delivers it to the second user using various methods, such as a messenger, e-mail, and SMS. The second user may input the received text string to the second chatbot through chatting. In some embodiments, the second chatbot may obtain the first chatbot user ID through a different root without obtaining it from the first user. The second chatbot transmits an event sharing group generation and join request, including the first chatbot user ID and a second chatbot user ID including the ID of the second chatbot and the ID of the second user, to the cross chatbot gateway. The cross chatbot gateway that has received the event sharing group generation and join request generates an event sharing group and then registers the first chatbot user ID and the second chatbot user ID with the group. The cross chatbot gateway may notify the first chatbot user ID of the event sharing group generation and join fact.

(3) Method of Receiving Event Sharing Group ID from Another User and Joining Event Sharing Group If an event sharing group has already been generated, a user may receive the event sharing group ID and join a corresponding group. The first user receives a group ID that the first user has joined from the first chatting server and delivers the group ID to the second user. In this case, the group ID may have various formats as in the previous embodiment. The second user inputs the received group ID to the second chatbot through chatting. The second chatbot transmits an event sharing group join request, including the received group ID and a second chatbot user ID, to the cross chatbot gateway. The cross chatbot gateway registers the second chatbot user ID with the corresponding event sharing group. The cross chatbot gateway may notify the first chatbot user ID of the group join fact of the second chatbot user ID or notify all the members of the group join fact of the second chatbot user ID.

When the second user joins the event sharing group, it may experience an authentication procedure. For example, the second user may receive authentication information, such as a group join password, from the first user, and may input the authentication information to the second chatbot through chatting. The second chatbot may include the authentication information in the event sharing group join request and transmit to the cross chatbot gateway. The cross chatbot gateway may register the second chatbot user ID with the event sharing group only when the authentication information is valid. The authentication information may be generated by the cross chatbot gateway or may be designated by a user.

(4) Method of Receiving ID of Another User and Enlisting Another User in Event Sharing Group If an event sharing group has already been generated, a user may receive the ID of another user and enlist the another user in a corresponding group. The first user receives a second chatbot user ID from the second user and inputs the second chatbot user ID to the first chatbot through chatting. In some embodiments, the first chatbot may obtain the second chatbot user ID through a different root without obtaining it from the second user. The first chatbot transmits an event sharing group join request, including the second chatbot user ID and an event sharing group ID, to the cross chatbot gateway. In this case, the first chatbot may receive information on a group in which the second user is to be enlisted from the first user or may select a group in which the second user is to be enlisted by itself without direct indication from the first user. The cross chatbot gateway that has received the event sharing group join request registers the second chatbot user ID with the corresponding event sharing group. The cross chatbot gateway may notify the second chatbot user ID of the group join fact of the second chatbot user ID or may notify all the members of the group of the group join fact of the second chatbot user ID.

2. Method of Managing Event Sharing Couple of Cross Chatbot Gateway

The cross chatbot gateway may manage a pair of chatbot user IDs, that is, a couple between which an event is to be shared. This corresponds to a case where the number of members of all groups is only two in the above-described grouping method. In this case, this is described as a separate embodiment because a group ID does not need to be used.

The first user receives a second chatbot user ID from the second user and inputs the second chatbot user ID to the first chatbot through chatting. In some embodiments, the first chatbot may obtain the second chatbot user ID through a different root without obtaining it from the second user. The first chatbot transmits an event sharing coupling request, including the user of the second chatbot, to the cross chatbot gateway. The cross chatbot gateway that has received the event sharing coupling request registers a first chatbot user ID and the second chatbot user ID as a couple. The cross chatbot gateway may notify the second chatbot user ID of the coupling fact.

Each chatting user ID may be coupled with several chatting user IDs. The cross chatbot gateway stores only a list of coupled pairs in the database, but does not need to store the ID of each couple. When a specific chatting user ID requests its own coupling information, the cross chatbot gateway may provide the specific chatting user ID with chatbot user IDs coupled with the chatting user ID. Accordingly, a chatbot can be aware of specific chatbot user ID and chatbot users with which an event will be shared, and may determine a target with which an event will be shared, that is, destination information of an event message.

A chatbot may designate a sharing target of event information by including at least one of a messenger type ID, a chatbot ID, and a user ID in destination information of an event message. For example, if a chatbot ID is included, but a user ID is not included in destination information, event information may be delivered to all the users of a corresponding chatbot among coupling targets. If destination information does not indicate a specific target, for example, no ID is included in the destination information, event information may be delivered to all coupling targets.

3. Method of Managing Event Sharing Group by Chatbot

The cross chatbot gateway may simply function to deliver event information, and an event sharing group may be managed by a chatbot. That is, a chatbot may generate an event sharing group by itself and store chatbot user IDs in a database by associating them with the ID of a corresponding group.

In this case, a specific one or more chatbots may play the role of the administrator of the group, or every chatbot may manage a group by itself without a separate administrator. If the administrator of a group is present, the joining/withdrawal of a member may be performed by requesting it to the administrator. Members may be notified of the joining/withdrawal of a member from the administrator, and may receive information of current members by requesting the information. Members may receive the chatbot user IDs of the members from the administrator and directly transmit an event message to a specific member. In some embodiments, a member delivers the event message to the administrator, and the administrator may relay the event message to other members. The administrator may determine that the event message will be relayed to which member.

If a chatbot manages an event sharing group, an event sharing group generation and member join method may include various embodiments as follows.

(1) Method of Receiving ID of Another User through CCG and Generating Event Sharing Group The first chatbot may receive a second chatbot user ID through the cross chatbot gateway and generate an event sharing group by itself. The first user receives a first chatbot user ID from the first chatbot and delivers it to the second user through e-mail, a messenger, etc. The second user inputs the received first chatbot user ID to the second chatbot through chatting. The second chatbot transmits an event sharing group generation and join request, including the second chatbot user ID, to the cross chatbot gateway using the first chatbot user ID as a destination. The cross chatbot gateway delivers the event sharing group generation and join request to the first chatbot. The first chatbot that has received the event sharing group generation and join request generates an event sharing group, and then registers the first chatbot user ID and the second chatbot user ID with the group. The first chatbot may notify the second chatbot user ID of the event sharing group generation and join fact through the cross chatbot gateway. The second chatbot that has received the event sharing group generation and join fact may manage the corresponding group by itself.

(2) Method of Receiving ID of Another User Through Chatting and Generating Event Sharing Group The first chatbot may receive a second chatbot user ID from the first user through chatting and generate an event sharing group by itself. The second user receives the second chatbot user ID from the second chatbot and delivers it to the first user through e-mail, a messenger, etc. The first user inputs the received second chatbot user ID to the first chatbot through chatting. The first chatbot that has received the second chatbot user ID generates an event sharing group and then registers a first chatbot user ID and the second chatbot user ID with the group. The first chatbot may notify the second chatbot user ID of the event sharing group generation and join fact through the cross chatbot gateway. The second chatbot that has received the event sharing group generation and join fact may manage the corresponding group by itself.

(3) Method of Receiving Event Sharing Group ID through CCG and Enlisting ID in Event Sharing Group If the first chatbot manages an already generated event sharing group, it may receive a group ID and a second chatbot user ID through the cross chatbot gateway and enlist the second chatbot user ID in the corresponding group. The first user receives an event sharing group ID and a first chatbot user ID from the first chatbot and delivers them to the second user through e-mail, a messenger, etc. The second user inputs the received event sharing group ID and first chatbot user ID to the second chatbot through chatting. The second chatbot transmits an event sharing group join request, including the event sharing group ID and the second chatbot user ID, to the cross chatbot gateway using the first chatbot user ID as a destination. The cross chatbot gateway delivers the event sharing group join request to the first chatbot. The first chatbot that has received the event sharing group join request registers the second chatbot user ID with the corresponding event sharing group. The first chatbot may notify the second chatbot user ID of the group join fact through the cross chatbot gateway. The second chatbot that has received the group join fact may receive information of group members from the first chatbot and manage the corresponding group by itself.

(4) Method of Receiving ID of Another User Through Chatting and Enlisting ID in Event Sharing Group If the first chatbot manages an already generated event sharing group, it may receive a second chatbot user ID from the first user through chatting and enlist the second chatbot user ID in a corresponding group. The second user receives the second chatbot user ID from the second chatbot and delivers it to the first user through e-mail, a messenger, etc. The first user inputs the received second chatbot user ID to the first chatbot through chatting. The first chatbot registers the second chatbot user ID with the event sharing group. In this case, the first chatbot may receive information on a group in which the second user is to be enlisted from the first user or may select a group in which the second user is to be enlisted by itself without direct indication from the first user. The first chatbot may notify the second chatbot user ID of the group join fact through the cross chatbot gateway. The second chatbot that has received the group join fact may receive information of group members from the first chatbot and manage the corresponding group by itself.

4. Method for Chatbot to Manage Event Sharing Couple

The cross chatbot gateway may simply function to deliver event information, and an event sharing couple may be managed by a chatbot. That is, a chatbot may register two chatbot user IDs as a couple and store them in a database by itself.

In this case, one or more chatbots may play the role of the administrator of all couples or every chatbot may manage a couple by itself without a separate administrator. If the administrator of a couple is present, coupling is performed by requesting it to the administrator. Members may be notified of the coupling from the administrator, and may receive information of current coupling counterparts by requesting the information. The members may receive the chatbot user IDs of coupling counterparts from the administrator, and may directly transmit an event message to a specific member. In some embodiments, a member may deliver an event message to an administrator, and the administrator may relay the event message to other members. The administrator may determine that the event message will be relayed to which member.

If a chatbot manages an event sharing couple, a coupling method may include the following embodiments.

(1) Method of Receiving ID of Another User Through CCG and Performing Event Sharing Coupling The first chatbot may receive a second chatbot user ID through the cross chatbot gateway and perform event sharing coupling by itself. The first user receives a first chatbot user ID from the first chatbot and delivers it to the second user through e-mail or a messenger. The second user inputs the received first chatbot user ID to the second chatbot through chatting. The second chatbot transmits an event sharing coupling request, including the second chatbot user ID, to the cross chatbot gateway using the first chatbot user ID as a destination. The cross chatbot gateway delivers the event sharing coupling request to the first chatbot. The first chatbot that has received the event sharing coupling request registers the first chatbot user ID and the second chatbot user ID as a couple. The first chatbot may notify the second chatbot user ID of the coupling fact through the cross chatbot gateway. The second chatbot that has received the coupling fact may manage the couple by itself.

(2) Method of Receiving ID of Another User Through Chatting and Performing Event Sharing Coupling The first chatbot may receive a second chatbot user ID from the first user through chatting and perform event sharing coupling by itself. The second user receives the second chatbot user ID from the second chatbot and delivers it to the first user through e-mail or a messenger. The first user inputs the received second chatbot user ID to the first chatbot through chatting. The first chatbot that has received the second chatbot user ID registers a first chatbot user ID and the second chatbot user ID as a couple. The first chatbot may notify the second chatbot user ID of the coupling fact through the cross chatbot gateway. The second chatbot that has received the coupling fact may manage the couple by itself.

Through the above-described various embodiments, a target with which an event will be shared can be registered as a group or couple. A chatbot may select targets with which a current event will be shared among event sharing targets described above, and may generate destination information. A first chatbot may determine which event will be shared and/or that an event will be shared with which chatbot depending on the type of group or couple with which a first user has been registered. That is, the first chatbot may generate event information and/or destination information based on the type of group or couple with which the first user has been registered. The first chatbot may generate the event information and/or the destination information based on the type of chatbot registered with the group or couple with which the first user has been registered or personal information of a second user registered with the group or couple with which the first user has been registered. The personal information may include use information of the second user, information generated by other second chatbot service. The chatbot may receive personal information on a specific chatbot user ID by requesting the personal information from the cross chatbot gateway. The first chatbot may receive personal information on all chatbot user IDs registered as a group or couple with respect to the first chat from the cross chatbot gateway without a separate request. In some embodiments, the cross chatbot gateway and the chatbot server may be a single server.

A chatbot may transmit event information of a user to the cross chatbot gateway without destination information. In this case, the cross chatbot gateway may deliver the event information to the IDs of all users with which the ID of the corresponding user has been registered as a group or couple.

Figure 3:
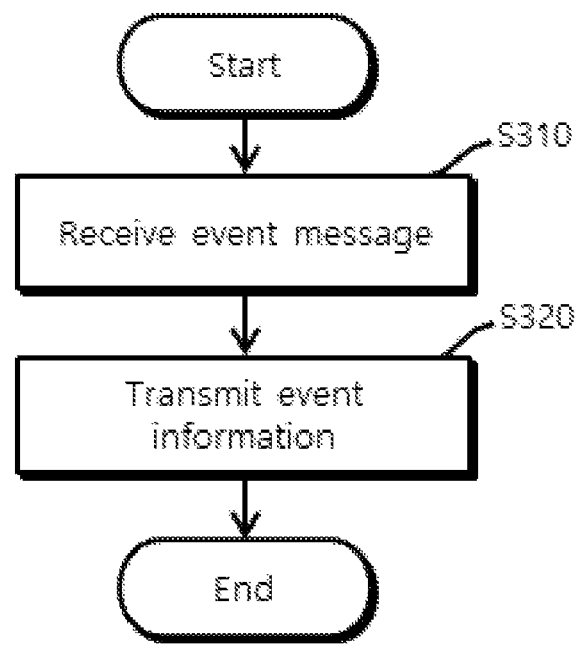
FIG. 3 is a flowchart showing a flow of a method of sharing an event between chatbots, which is performed by a cross chatbot gateway, according to an embodiment of the present invention.

FIG. 3 is a flowchart showing a flow of a method of sharing an event between chatbots, which is performed by the cross chatbot gateway, according to an embodiment of the present invention. Referring to FIG. 3, the method of sharing an event between chatbots, which is performed by the cross chatbot gateway according to an embodiment of the present invention, includes the steps of receiving an event message from a first chatbot communicating with a first chatting server using a first chatting protocol, wherein the event message includes destination information and event information of a first user, that is, a chatting counterpart of the first chatbot (S310) and transmitting the event information to a second chatbot communicating with a second chatting server using a second chatting protocol based on the destination information (S320).

Figure 4:
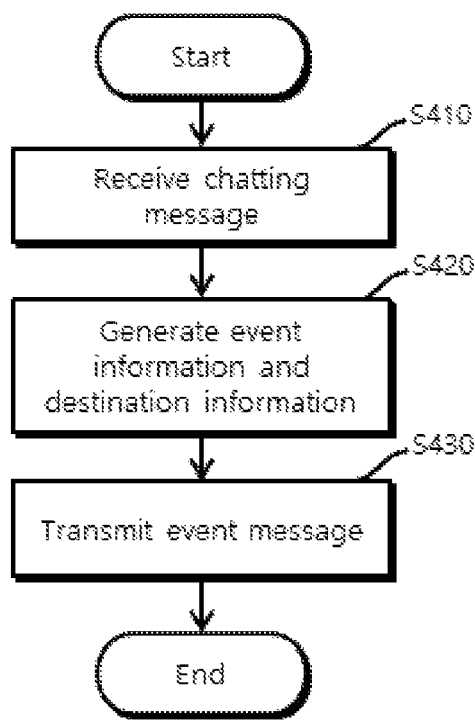
FIG. 4 is a flowchart showing a flow of a method of sharing an event between chatbots, which is performed by a first chatbot communicating with a first chatting server using a first chatting protocol, according to an embodiment of the present invention.

FIG. 4 is a flowchart showing a flow of a method of sharing an event between chatbots, which is performed by a first chatbot communicating with a first chatting server using a first chatting protocol, according to an embodiment of the present invention. Referring to FIG. 4, the method of sharing an event between chatbots, which is performed by a first chatbot communicating with a first chatting server using a first chatting protocol, according to an embodiment of the present invention includes the steps of receiving the chatting message of a first user from the first chatting server (S410), generating event information of the first user and destination information at which the event information is to be received based on the chatting message (S420), and transmitting an event message, including the event information of the first user and the destination information, to a cross chatbot gateway (S430).

Figure 5:
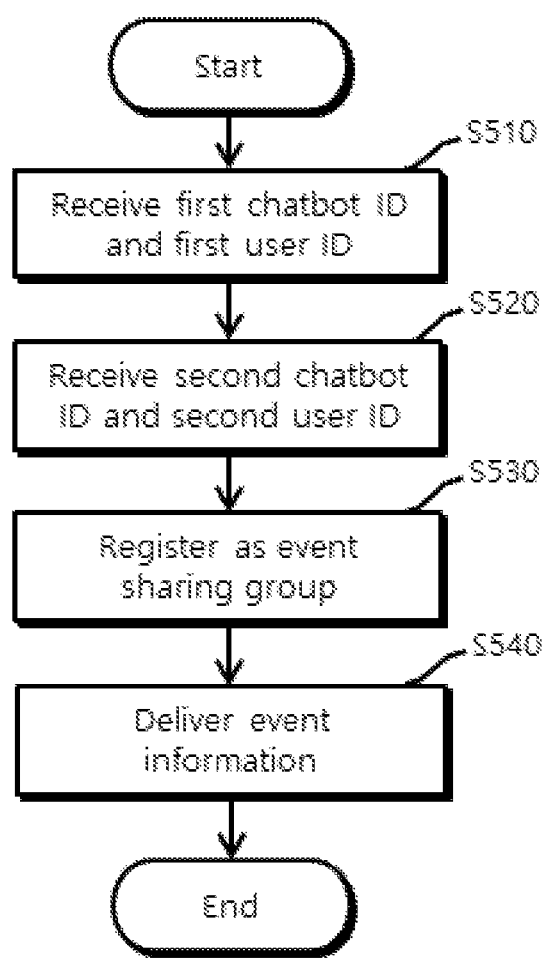
FIG. 5 is a flowchart showing a flow of a method of sharing an event between chatbots, which is performed by a cross chatbot gateway without destination information, according to an embodiment of the present invention.

FIG. 5 is a flowchart showing a flow of a method of sharing an event between chatbots, which is performed by the cross chatbot gateway without destination information, according to an embodiment of the present invention. Referring to FIG. 5, the method of sharing an event between chatbots, which is performed by the cross chatbot gateway without destination information, according to an embodiment of the present invention includes the steps of receiving the ID of a first chatbot and the ID of a first user of the first chatbot (S510), receiving the ID of a second chatbot and the ID of a second user of the second chatbot (S520), registering the first user of the first chatbot and the second user of the second chatbot as an event sharing group based on the ID of the first chatbot, the ID of the first user, the ID of the second chatbot, and the ID of the second user (S530), and delivering event information of the first user received from the first chatbot to the second user or event information of the second user received from the second chatbot to the first user based on the event sharing group (S540).

Figure 6:
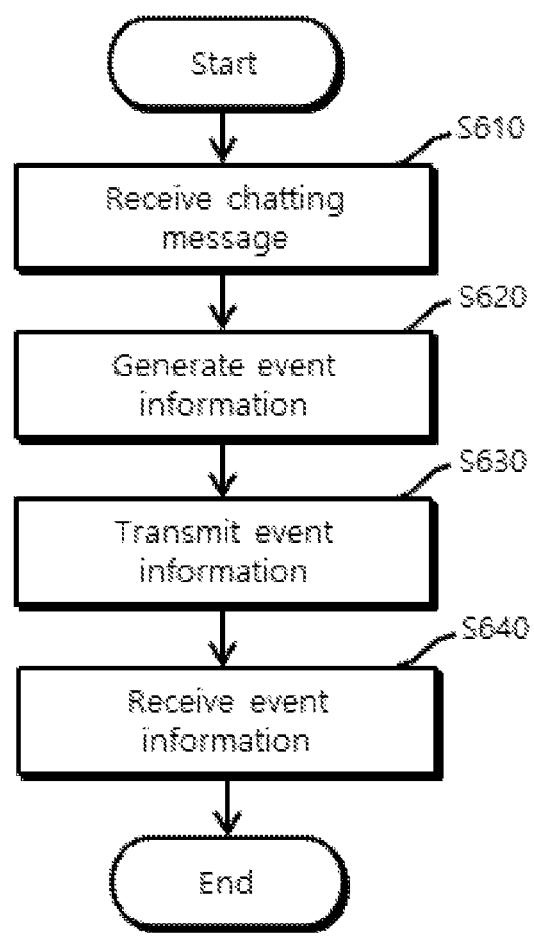
FIG. 6 is a flowchart showing a flow of a method of sharing an event between chatbots, which is performed by a first chatbot communicating with a first chatting server using a first chatting protocol without destination information, according to an embodiment of the present invention.

FIG. 6 is a flowchart showing a flow of a method of sharing an event between chatbots, which is performed by a first chatbot communicating with a first chatting server using a first chatting protocol without destination information, according to an embodiment of the present invention. Referring to FIG. 6, the method of sharing an event between chatbots, which is performed by a first chatbot communicating with a first chatting server using a first chatting protocol without destination information, according to an embodiment of the present invention includes the steps of receiving a chatting message of a first user from the first chatting server (S610), generating event information of the first user based on the chatting message (S620), transmitting the event information of the first user to a cross chatbot gateway (S630), and receiving event information of a second user, that is, a chatting counterpart of a second chatbot communicating with a second chatting server using a second chatting protocol, from the cross chatbot gateway (S640).

Figure 7:
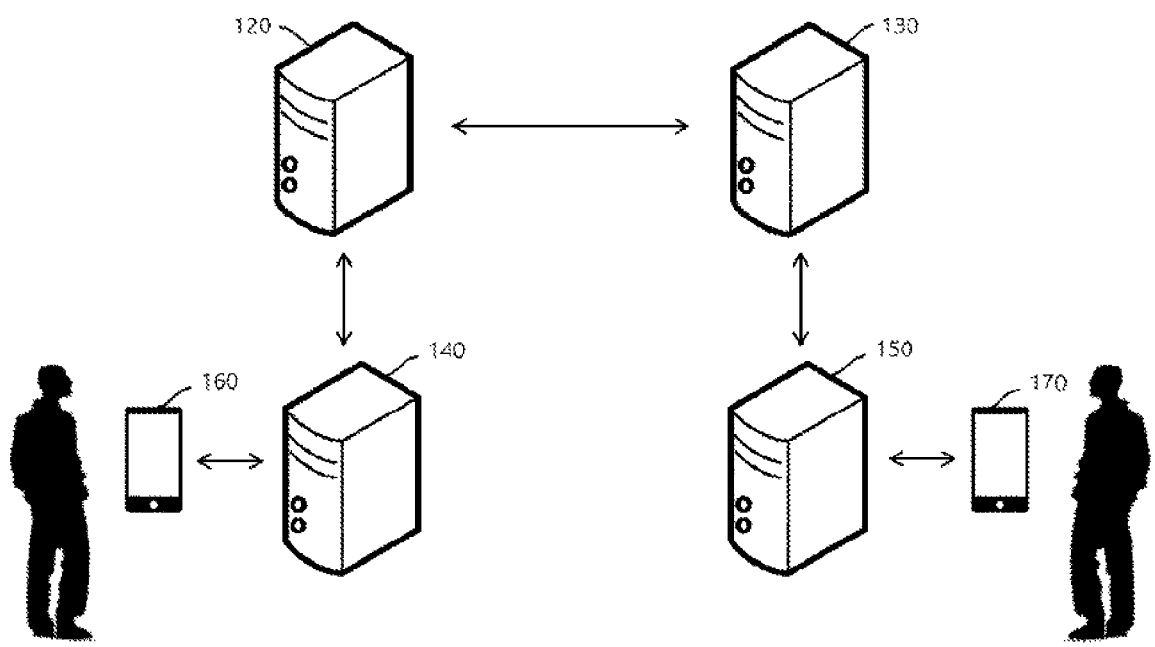
FIG. 7 is a diagram schematically showing the configuration of a system for sharing an event between chatbots according to another embodiment of the present invention.

FIG. 7 is a diagram schematically showing the configuration of a system for sharing an event between chatbots according to another embodiment of the present invention. In the embodiment of FIG. 7, unlike in the embodiment of FIG. 1, the cross chatbot gateway 110 is not present. The methods for a chatbot to deliver an event message to a virtual user using a remote proxy pattern have been introduced. In the present embodiment, the cross chatbot gateway is not actually present, and the first chatbot server and the second chatbot server directly exchange event information. That is, the first chatbot may generate event information and destination information, and may transmit the event information to the second chatbot based on the generated destination information.

All the methods described in relation to the embodiment of FIG. 1 may also be used in the present embodiment. That is, the above-described various grouping/coupling method, event information and destination information generation methods, event message transmission methods, etc. may be modified, if necessary, and applied to the present embodiment. For example, when the first chatbot receives a second chatbot user ID and generates an event sharing group or enlist the second chatbot user ID in the event sharing group, it directly receives the second chatbot user ID from the second chatbot not from the cross chatbot gateway.

In the present embodiment, event sharing group information and couple information are managed by a chatbot because a cross chatbot gateway is not present. In this case, each chatbot may manage the URLs of other chatbots, and the URL of a corresponding chatbot may be included in the ID of a chatbot itself.

In the present embodiment, to transmit an event message or event information to a specific chatbot user ID means that the event message or event information is directly transmitted to a corresponding chatbot using a corresponding user as a destination.

Figure 8:
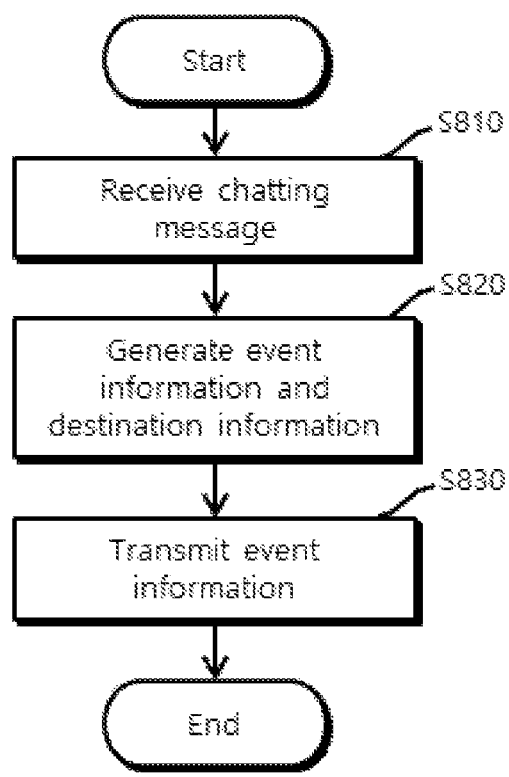
FIG. 8 is a flowchart showing a flow of a method of sharing an event between chatbots, which is performed by a first chatbot communicating with a first chatting server using a first chatting protocol without a cross chatbot gateway, according to an embodiment of the present invention.

FIG. 8 is a flowchart showing a flow of a method of sharing an event between chatbots, which is performed by a first chatbot communicating with a first chatting server using a first chatting protocol without the cross chatbot gateway, according to an embodiment of the present invention. Referring to FIG. 8, the method of sharing an event between chatbots, which is performed by a first chatbot communicating with a first chatting server using a first chatting protocol, according to an embodiment of the present invention includes the steps of receiving the chatting message of a first user from the first chatting server (S810), generating event information of the first user and destination information at which the event information is to be received based on the chatting message (S820), and transmitting the event information to a second chatbot communicating with a second chatting server using a second chatting protocol based on the destination information (S830).

The present invention may also be implemented as computer-readable code in a computer-readable recording medium. The computer-readable recording medium includes all storage media, such as magnetic storage media, optical reading media and carrier waves (e.g., transmission through the Internet). The present invention has been described in detail so far based on the preferred embodiments shown in the accompanying drawings. However, the embodiments are not intended to limit the present invention, but are only illustrative, and they should be considered from a descriptive viewpoint not a limitative viewpoint. The true technical range of protection of the present invention should be determined by the technical spirit of the claims not the above-described description. Although specific terms have been used in the specification, they are merely used to describe the concept of the present invention and are not used to limit the scope of the present invention described in the claims. Accordingly, a person having ordinary skill in the art to which the present invention pertains will understand that various modifications and other equivalent embodiments are possible without departing from the intrinsic technical spirit of the present invention written in the claims. Furthermore, it should be understood that the equivalents include equivalents to be developed in the future, that is, all of elements invented to perform the same function regardless of their structures, in addition to the known equivalents.

The invention claimed is:

1. A method of sharing an event between chatbots, the method performed by a cross chatbot gateway that comprises a communication unit transmitting and receiving data, and a controller processing data transmitted and received through the communication unit, the method comprising:

receiving an event message from a first chatbot exchanging chatting messages with a first user which is a chatting counterpart of the first chatbot via a first chatting server by communicating with the first chatting server using a first chatting protocol, wherein the event message is generated by the first chatbot upon receiving, from the first chatting server, a chatting message of the first user, the event message comprises destination information and event information of the first user, and the first chatbot and the first user are pre-registered with the cross chatbot gateway; and transmitting the event information to a second chatbot exchanging chatting messages with a second user which is a chatting counterpart of the second chatbot via a second chatting server by communicating with the second chatting server using a second chatting protocol based on the destination information, wherein the second chatbot and the second user are pre-registered with the cross chatbot gateway, and wherein the event information is new information generated based on the chatting message of the first user and is different from the chatting message of the first user, and wherein the first chatting server and the second chatting server are different from each other and the first chatting protocol is different from the second chatting protocol.

2. The method of claim 1, wherein the first chatbot and the second chatbot are different types of chatbots.

3. The method of claim 1, wherein:
the destination information comprises a chatbot user ID,
the chatbot user ID comprises an ID of the second chatbot and an ID of the second user, and
the transmitting the event information comprises transmitting the event information to the chatbot user ID.

4. The method of claim 3, wherein:
the chatbot user ID comprises a messenger type ID of the second chatting server, and
the first chatting server and the second chatting server are chatting servers for different types of messengers.

5. The method of claim 1, further comprising:
generating the event information and the destination information; and
transmitting the generated event information to the second chatbot based on the generated destination information.

6. The method of claim 1, further comprising:
generating an event sharing group;
registering a first chatbot user ID, comprising an ID of the first chatbot and an ID of the first user, with the event sharing group;

receiving an event sharing group join request comprising a second chatbot user ID, wherein the second chatbot user ID comprises an ID of the second chatbot and an ID of the second user; and registering the second chatbot user ID with the event sharing group based on the event sharing group join request.

7. The method of claim 6, further comprising transmitting the registered chatbot user IDs to the first chatbot when a member information provision request for the event sharing group is received from the first chatbot.

8. The method of claim 6, wherein:

the event sharing group join request is received from the second chatbot and comprises the first chatbot user ID, the generating the event sharing group comprises generating the event sharing group based on the event sharing group join request, and the registering the first chatbot user ID comprises registering the first chatbot user ID based on the event sharing group join request.

9. The method of claim 6, further comprising transmitting an ID of the event sharing group to the first chatbot user ID, wherein the event sharing group join request is received from the second chatbot and comprises the ID of the event sharing group transmitted to the first chatbot user ID.

10. The method of claim 6, wherein the event sharing group join request is received from the first chatbot and comprises an ID of the event sharing group.

11. The method of claim 1, further comprising:

modifying the event information by the cross chatbot gateway upon receiving the event message that contains the event information from the first chatbot and before transmitting the event information to the second chatbot; and processing the modified event information by the second chatbot upon receiving the modified event information from the cross chatbot gateway and transmitting the modified event information to the second user in a form of a chatting message.

12. A method of sharing an event between chatbots, the method comprising:

registering a first chatbot and a first user which is a chatting counterpart of the first chatbot with a cross chatbot gateway, wherein the cross chat gateway comprises a communication unit transmitting and receiving data, and a controller processing data transmitted and received through the communication unit, and wherein the first chatbot and the first user exchange chatting messages with each other via a first chatting server by communicating with the first chatting server using a first chatting protocol;

registering a second chatbot and a second user which is a chatting counterpart of the second chatbot with the cross chatbot gateway, wherein the second chatbot and the second user exchange chatting messages with each other via a second chatting server by communicating with the second chatting server using a second chatting protocol;

receiving, at the first chatbot, a chatting message of the first user from the first chatting server;

generating, at the first chatbot, event information of the first user and destination information at which the event information is to be received based on the chatting message of the first user;

transmitting, by the first chatbot, an event message, comprising the event information of the first user and the destination information, to the cross chatbot gateway; and delivering, by the cross chatbot gateway, the event information contained in the event message to the second chatbot, wherein the event information is new information generated based on the chatting message of the first user and is different from the chatting message of the first user, and wherein the first chatting server and the second chatting server are different from each other and the first chatting protocol is different from the second chatting protocol.

13. The method of claim 12, further comprising:

modifying the event information by the cross chatbot gateway upon receiving the event message that contains the event information from the first chatbot and before delivering the event information to the second chatbot; and processing the modified event information by the second chatbot upon receiving the modified event information from the cross chatbot gateway and transmitting the modified event information to the second user in a form of a chatting message.

14. The method of claim 12, wherein:

the destination information comprises a chatbot user ID, and the chatbot user ID comprises an ID of the second chatbot and an ID of the second user.

15. The method of claim 14, wherein:

the chatbot user ID comprises a messenger type ID of the second chatting server, and the first chatting server and the second chatting server are chatting servers for different types of messengers.

16. The method of claim 12, further comprising:

generating event information and destination information without being based on a specific chatting message of a user received from a chatting server; and transmitting an event message, comprising the event information and destination information generated without being based on a specific chatting message of the user, to the cross chatbot gateway.

17. The method of claim 12, further comprising:

receiving event information of the second user from the cross chatbot gateway;

generating event information and destination information based on the event information of the second user; and transmitting an event message of the second user, comprising the event information and destination information generated based on the event information of the second user, to the cross chatbot gateway.

18. The method of claim 12, further comprising:

receiving an event sharing group generation request chatting message of the first user, comprising a second chatbot user ID, from the first chatting server, wherein the second chatbot user ID comprises an ID of the second chatbot and an ID of the second user; and transmitting an event sharing group generation request comprising a first chatbot user ID and the second chatbot user ID to the cross chatbot gateway, wherein the first chatbot user ID comprises an ID of the first chatbot and an ID of the first user.

19. The method of claim 12, further comprising:
receiving an event sharing group join request chatting message of the first user, comprising an ID of an event sharing group, from the first chatting server; and
transmitting an event sharing group join request, comprising the ID of the event sharing group and a first chatbot user ID, to the cross chatbot gateway,
wherein the first chatbot user ID further comprises an ID of the first chatbot and an ID of the first user.

20. The method of claim 12, further comprising:
receiving an event sharing group join request chatting message of the first user, comprising a second chatbot user ID and requesting group join of the second chatbot user ID, from the first chatting server, wherein the second chatbot user ID comprises an ID of a second chatbot and an ID of the second user; and
transmitting an event sharing group join request, comprising an event sharing group ID and the second chatbot user ID, to the cross chatbot gateway.

21. The method of claim 12, further comprising:
transmitting a member information provision request for an event sharing group to the cross chatbot gateway; and
receiving chatbot user IDs registered with the event sharing group from the cross chatbot gateway.

22. A non-transitory computer-readable recording medium containing computer-executable programming instructions for performing a method of sharing an event between chatbots, the method comprising:
registering a first chatbot and a first user which is a chatting counterpart of the first chatbot with a cross chatbot gateway, wherein the cross chat gateway comprises a communication unit transmitting and receiving data, and a controller processing data transmitted and received through the communication unit, and wherein the first chatbot and the first user exchange chatting messages with each other via a first chatting server by communicating with the first chatting server using a first chatting protocol;
registering a second chatbot and a second user which is a chatting counterpart of the second chatbot with the cross chatbot gateway, wherein the second chatbot and the second user exchange chatting messages with each other via a second chatting server by communicating with the second chatting server using a second chatting protocol;
receiving, at the first chatbot, a chatting message of the first user from the first chatting server;
generating, at the first chatbot, event information of the first user and destination information at which the event information is to be received based on the chatting message of the first user;
transmitting, by the first chatbot, an event message, comprising the event information of the first user and the destination information, to the cross chatbot gateway; and
delivering, by the cross chatbot gateway, the event information contained in the event message to the second chatbot,
wherein the event information is new information generated based on the chatting message of the first user and is different from the chatting message of the first user, and
wherein the first chatting server and the second chatting server are different from each other and the first chatting protocol is different from the second chatting protocol.

23. A cross chatbot gateway, comprising:
a communication unit transmitting and receiving data; and
a controller, wherein:
the controller receives an event message from a first chatbot which is pre-registered with the cross chatbot gateway and communicates with a first chatting server using a first chatting protocol through the communication unit, wherein the event message comprises destination information and event information of a first user which is a chatting counterpart of the first chatbot and is pre-registered with the cross chatbot gateway, and the first chatbot and the first user exchange chatting messages with each other via the first chatting server by communicating with the first chatting server using the first chatting protocol, and
the controller transmits the event information to a second chatbot which is pre-registered with the cross chatbot gateway and communicates with a second chatting server using a second chatting protocol based on the destination information through the communication unit, wherein the second chatbot exchanges chatting messages, via the second chatting server, with a second user, which is a chatting counterpart of the second chatbot and is pre-registered with the cross chatbot gateway, by communicating with the second chatting server using the second chatting protocol,
wherein the event information is new information generated based on a chatting message of the first user and is different from the chatting message of the first user, and
wherein the first chatting server and the second chatting server are different from each other and the first chatting protocol is different from the second chatting protocol.

24. A chatbot server, comprising:
a communication unit transmitting and receiving data; and
a first chatbot,
wherein the first chatbot receives, from the chatbot server using a first chatting protocol through the communication unit, a chatting message of a first user which is a chatting counterpart of the first chatbot and which exchanges chatting messages with the first chatbot via the chatbot server by communicating with the chatbot server using the first chatting protocol, generates event information of the first user and destination information at which the event information is to be received based on the chatting message of the first user, and transmits through the communication unit, an event message, comprising the event information and the destination information, to a cross chatbot gateway with which the first chatbot and the first user are pre-registered and which in turn transmits the event information to a different chatbot server comprising a second chatbot,
wherein the second chatbot and a second user, which is a chatting counterpart to the second chatbot, are pre-registered with the cross chatbot gateway, and the second chatbot and the second user exchange chatting messages with each other via the different chatbot server by communicating with the different chatbot server using a second chatting protocol, wherein the event information is new information generated based on the chatting message of the first user and is different from the chatting message of the first user, and wherein the first chatting protocol is different from the second chatting protocol.

\* \* \* \* \*